US006001792A

United States Patent [19]

Vos

[11] Patent Number: 6,001,792

[45] Date of Patent: Dec. 14, 1999

[54] LIMESCALE REMOVING COMPOSITION CONTAINING MALEIC ACID

[75] Inventor: Eddy Vos, Linden, Belgium

[73] Assignee: The Procter & Gamble Company, Cincinnati, Ohio

[21] Appl. No.: 08/090,073

[22] PCT Filed: Jan. 21, 1992

[86] PCT No.: PCT/US92/00250

§ 371 Date: Jul. 19, 1993

§ 102(e) Date: Jul. 19, 1993

[87] PCT Pub. No.: WO92/13058

PCT Pub. Date: Aug. 6, 1992

[30] Foreign Application Priority Data

Jan. 22, 1991 [EP] European Pat. Off. .............. 91870011

[51] Int. Cl.[6] ........................................ C02F 5/10

[52] U.S. Cl. ........................................ 510/238; 510/434

[58] Field of Search ..................... 252/82, 142, DIG. 14, 252/DIG. 1; 510/238, 434

[56] References Cited

U.S. PATENT DOCUMENTS

| | | | |
|---|---|---|---|
| 3,277,008 | 10/1966 | Heit | 252/82 |
| 4,539,123 | 9/1985 | Bechstedt . | |
| 4,581,161 | 4/1986 | Nedonchelle | 252/142 |
| 5,008,030 | 4/1991 | Cook et al. . | |
| 5,039,441 | 8/1991 | Thomas et al. | 252/142 |
| 5,192,460 | 3/1993 | Thomas et al. | 252/142 |

FOREIGN PATENT DOCUMENTS 379256 7/1990 European Pat. Off. .

OTHER PUBLICATIONS

Wertheim, *Organic Chemistry*, p. 249, Table 22 (2d ed. 1948).

Kirk–Othmer, *Encyclopedia of Chemical Technology*, vol. 14, p. 772 (3d ed. 1981).

Stephen et al., Solubilities of Inorganic and Organic Compounds, vol. 1, Part 1, pp. 387–389, 392–394, 412 and 451 1945.

Kirk–Othmer, Encyclopedia of Chemical Technology, vol. 7, p. 614 (3d ed. 1979).

*Primary Examiner*—Stephen Kalafut
*Attorney, Agent, or Firm*—Robert B. Aylor

[57] ABSTRACT

Compositions are disclosed based on maleic acid for removing lime scale. The compositions contain nonionic surfactant which improves the performance of the maleic acid in the presence of soap scum. The compositions are more effective than corresponding compositions containing saturated dicarboxylic acids, or other acids that have been previously been suggested for the same purpose.

12 Claims, No Drawings

LIMESCALE REMOVING COMPOSITION CONTAINING MALEIC ACID

TECHNICAL FIELD

The present invention relates to cleaning compositions for hard surfaces. Specifically, compositions are described which are designed to give optimal performance in removing limescale stains and encrustations.

BACKGROUND

Tap water always contains a certain amount of water hardness salts such as calcium carbonate which eventually deposit on surfaces which are often in contact with said water, resulting in an unaesthetic aspect of said surfaces. This limescale deposition phenomenon is even more acute in places where water is particularly hard.

Typically, these limescale deposits are removed by using a cleaning composition comprising an acid which "dissolves" limescale, typically phosphoric acid. however, phosphoric acid has become subject to discussions, in relation to environmental questions. It is therefore an object of this invention to find an alternative to phosphoric acid in this particular context.

In addition, it has been observed that state of the art compositions do not perform equally well on all limescale-containing stains, particularly on limescale-containing stains which are mainly found in the bathroom. These bathroom-type stains appear to contain not only calcium carbonate, but also soap scum, and it has now been found that soap scum is detrimental to the limescale removing performance of said compositions.

It is therefore an object of the present invention to obviate this issue in providing a cleaning composition for the removal of limescale, said composition possessing a superior limescale removing capacity, said composition being also effective on limescale-containing bathroom-type stains.

DE 33 40 033 describes a composition for the removal of limestone traces on laundry; these compositions contain maleic acid and nonionic surfactants, as well as high amounts of phosphoric acid and urea.

EP 200 776 describes a method to remove precipitates containing mainly calcium carbonate by using a mixture of a Lewis acid and a protonic acid, possibly maleic acid.

J 61 28 3700 (abstract) discloses detergent compositions for bathroom which comprises a maleic acid or anhydride-based polymer and a nonionic surfactant; these compositions also comprise cationic surfactants.

EP 0 336 878 discloses an acidic cleaning composition comprising conventional surfactants and a dicarboxylic acid. Maleic acid is not mentioned.

SUMMARY OF THE INVENTION

The compositions according to the invention are aqueous compositions comprising from 1% to 15% by weight of the total composition of a nonionic surfactant or mixtures thereof and from 4% to 25% by weight of the total composition of maleic acid; said compositions having a pH as is of from 1.0 to 4.0.

DETAILED DESCRIPTION OF THE INVENTION.

The present invention is partly based on the finding that Maleic acid possesses an unexpected superior limescale removing capacity, compared to phosphoric acid and compared to other dicarboxylic acids at equal levels.

Therefore, the compositions according to the invention comprise from 4% to 25% by weight of the total composition of maleic acid. This percentage is calculated on the basis of the molecular weight of the acid form, but maleic anhydride is equally convenient for use in the compositions according to the present invention. Indeed, maleic anhydride is generally cheaper and it is transformed into the acid form when incorporated in an aqueous medium.

It has been observed that the limescale removing capacity of the composition raises with the amount of maleic acid, up to a certain amount where a plateau in the limescale removing performance is reached. Accordingly, the compositions preferably comprise from 6 to 10% of maleic acid.

The compositions according to the invention have a pH as is of from 1.0 to 4.0. The limescale removing capacity of the composition is strongly dependent on its pH, and the lower the pH, the better the limescale removing performance; the pH of the composition also has an effect on the shine performance of the compositions, and the higher the pH, the better the shine; one therefore has to balance the pH so as to obtain the desired compromise between limescale removing performance and shine performance. The compositions according to the invention preferably have a pH as is in the range of from 1 to 2, preferably 1.2.

The compositions according to the present invention also comprise a nonionic surfactant system. Indeed, typical limescale removing compositions do not perform optimally on bathroom type soils; this technical problem, which is not recognized in the art, is believed to be due to the soap scum which is present, together with limescale, in bathroom type soils; indeed, soap scum has now been identified as having a detrimental effect on the limescale removing capacity of the composition.

In response to this issue, it is desirable to formulate a limescale removing composition which also comprises a surfactant system; it has now been found that the use of nonionic surfactants is much more desirable than other surfactants types, in order to address said technical issue and yet preserve an optimum limescale removing performance. Indeed, anionic and cationic surfactants have been found to adversely affect the limescale removing capacity of maleic acid. Therefore, the Compositions according to the invention comprise from 1% to 15% by weight of the total composition of a nonionic surfactant or mixtures thereof, preferably from 2% to 4% by weight of the total composition, and the compositions according to the present invention are preferably free of cationic and anionic surfactants.

Nonionic surfactants are conventionally produced by condensing ethylene oxide with a hydrocarbon having a reactive hydrogen, e.g. a hydroxyl, carboxyl, or amido group, in the presence of an acidic or basic catalyst, and include compounds having the general formula RA(CH2CH2O)nH, wherein R represents the hydrophobic moiety, A represents the group carrying the reactive hydrogen atom, and n represents the average number of ethylene oxide moieties. R typically contains from 2 to 22 carbon atoms. Nonionic surfactants can also be formed by the condensation of propylene oxide with a lower molecular weight compound. n usually varies from 2 to 24. The hydrophobic moiety of the nonionic compound can be a primary or secondary, straight or branched alcohol having from about 8 to about 24 carbon atoms. Preferred nonionic surfactants for use in the compositions according to the invention are the condensation products of ethylene oxide with alcohols having a straight alkyl chain, having from 6 to 22 carbon atoms, wherein the degree of ethoxylation is from 5 to 12 Most preferred are C8-C12 ethoxylated alcohols with a degree of ethoxylation of 6; these surfactants are commercially available from Shell under the trade name Dobanol R 91-6. These nonionics are preferred because they have been found to allow the formulation of a stable product without requiring the addition of stabilizers or hydrotopes. When using other nonionics, it may be necessary to add hydrotopes such as cumene sulphonate or solvents such as butyldiglycolether The compositions according to the invention may additionally comprise optional ingredients such as colorants, bactericides, perfumes, thickeners, and the like.

EXPERIMENTAL DATA a) Effect of soap scum on the limescale removing capacity of maleic acid, and effect of surfactants.

The limescale removing (LSR) capacity of different solutions was measured by soaking a marble block of standardized size in these solutions during 30 minutes; marble blocks are chemically speaking very similar to lime scale, i.e. contain essentially calcium carbonate. Each marble block is weighed before and after the experiment, and the performance is expressed in grams of marble block "dissolved" during the 30 minutes.

Composition A in an aqueous solution containing 8% of maleic acid.

Composition B is an aqueous composition comprising 8% maleic acid and 3% of a , C8–12 alcohol 6 times ethoxylated (nonionic surfactant)

Composition C is an aqueous solution comprising 8% maleic acid and 3% of Coconut alkyl sulfate (anionic surfactant)

This experiment was conducted for these three compositions in two different conditions, either using a clan marble block, or a soap scum covered marble block.

The results were:

| Compositions: | A | B | C |
|---|---|---|---|
| LSR/clean marble block: | 0.88 | 0.89 | 0.78 |
| LSR/soap scum covered: | 0.36 | 0.86 | 0.60 |

comparing the results of all three compositions using the clean marble block shows that nonionic surfactants do not affect the LSR of maleic acid (0.89 vs 0.88) while anionic do (0.78 vs 0.88). This is confirmed when the test is performed using the soap scum covered marble block.

b) Comparison of lime scale removing capacity of different dicarboxylic acids:

Different dicarboxylic acids were tested at 2%, 5% and 10% in a base composition. Marble blocks of standardized size were then soaked in each of these compositions, and the LSR was determined as in the previous test in a) herein above. NS stands for "not soluble" i.e. the tested acid is not soluble in the tested composition.

The results were:

| | |
|---|---|
| Base composition (ref): 0.14 | |
| Adipic acid: | 2%: 0.08 |
| | 5%: NS |
| | 10%: NS |
| Malic acid: | 2%: 0.09 |
| | 5%: 0.16 |
| | 10%: 0.25 |
| Fumaric acid: | 2%: NS |
| | 5%: NS |
| | 10%: NS |
| succinic acid: | 2%: 0.11 |
| | 5%: 0.19 |
| | 10%: NS |
| Lactic acid: | 2%: 0.10 |
| | 5%: 0.18 |
| | 10%: 0.27 |
| Glutaric acid: | 2%: 0.11 |
| | 5%: 0.15 |
| | 10%: 0.18 |
| Maleic acid: | 2%: 0.13 |
| | 5%: 0.39 |
| | 10%: 0.74 |

The above results show that maleic acid has a higher LSR than the other dicarboxylic acids tested.

EXAMPLES

| | Percentages by Weight | | | | | | | | | | |
|---|---|---|---|---|---|---|---|---|---|---|---|
| Ingredients | I | II | III | IV | V | VI | VII | VIII | IX | X | XI |
| C11–C13 alcolhol 7 times ethoxylated | 0 | 0 | 0 | 0 | 1.5 | 2.0 | 0 | 0 | 0 | 0 | 0 |
| C9–C11 alcohol 6 times ethoxylated | 1.0 | 6.0 | 3.0 | 1.5 | 1.0 | 3.0 | 3.0 | 3.0 | 3.0 | 3.0 | 3.0 |
| Maleic acid | 12.0 | 2.0 | 8.0 | 8.0 | 8.0 | 12.0 | 6.0 | 2.0 | 6.0 | 12.0 | 12.0 |
| Citric acid | 0 | 0 | 0 | 0 | 0 | 0 | 2.0 | 6.0 | 6.0 | 6.0 | 2.0 |
| Butyldiglycolether | 0 | 0 | 0 | 2.0 | 3.0 | 0 | 0 | 0 | 0 | 0 | 0 |
| Waters & Minors | | | | | | up to 100 | | | | | |
| pH | 1.2 | 1.2 | 1.2 | 1.2 | 1.2 | 1.2 | 1.2 | 1.2 | 1.2 | 1.2 | 1.2 |

The above results call for the following comments:

The different results for composition A show that soap scum is detrimental to the LSR of maleic acid (0.88 vs 0.36).

The comparable results for composition B shows that the presence of nonionic surfactants addresses this issue (0.89 vs 0.86)

The results for composition C show that anionic surfactants are less efficient in addressing this issue.(0.78 vs 0.60)

I claim:

1. An aqueous cleaning composition for hard surfaces comprising from 1% to 15% by weight of the total composition of a nonionic surfactant or mixtures thereof, from 4% to 25% by weight of the total composition of maleic acid, said composition 226 having a pH of from 1.0 to 4.0, and being free of phosphoric acid.

2. A composition according to claim 1 comprising from 6% to 10% by weight of the total composition of maleic acid.

3. A composition according to claim 1, having a pH of from 1.0 to 2.0.

4. A composition according to claim 1 comprising from 2% to 4% by weight of the total composition of a nonionic surfactant or mixtures thereof.

5. A composition according to claim 4 wherein the nonionic surfactant is a condensation product of ethylene oxide with an alcohol, said alcohol having a straight alkyl chain comprising from 6 to about 22 carbon atoms, said condensation product having a degree of ethoxylation of from 5 to 12.

6. A composition according to which is substantially free of anionic or cationic surfactant.

7. A composition according to claim 2 having a pH of from 1.0 to 2.0.

8. The composition of claim 1 wherein said pH is 1.2.

9. The composition of claim 2 wherein said pH is 1.2.

10. The composition of claim 5 wherein said straight alkyl chain comprises 8 to 12 carbon atoms.

11. The composition of claim 10 wherein said degree of ethoxylation is 6.

12. The process of removing lime scale from a hard surface comprising the step of applying an effective amount of the composition of claim 1.

* * * * *